US011070672B1

(12) United States Patent
Gailloux et al.

(10) Patent No.: US 11,070,672 B1
(45) Date of Patent: Jul. 20, 2021

(54) SYSTEM AND METHOD OF ADAPTING CUSTOMER CARE BASED ON SUBSCRIBER STATE

(71) Applicant: T-Mobile Innovations LLC, Overland Park, KS (US)

(72) Inventors: Michael A. Gailloux, Overland Park, KS (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 195 days.

(21) Appl. No.: 16/374,615

(22) Filed: Apr. 3, 2019

(51) Int. Cl.
| | |
|---|---|
| *G06Q 30/00* | (2012.01) |
| *H04M 3/51* | (2006.01) |
| *G06Q 10/06* | (2012.01) |
| *H04M 3/22* | (2006.01) |
| *H04M 3/523* | (2006.01) |
| *H04M 3/436* | (2006.01) |

(52) U.S. Cl.
CPC .... *H04M 3/5175* (2013.01); *G06Q 10/06312* (2013.01); *G06Q 30/016* (2013.01); *H04M 3/2218* (2013.01); *H04M 3/2281* (2013.01); *H04M 3/436* (2013.01); *H04M 3/5231* (2013.01); *H04M 3/5233* (2013.01); *H04M 2201/40* (2013.01)

(58) Field of Classification Search
CPC ............. H04M 3/5175; H04M 3/2218; H04M 3/2281; H04M 3/436; G06Q 10/06312; G06Q 30/016

USPC ................ 705/304, 39–44; 379/145, 114.14, 379/265.01–265.14, 266.01–266.1, 309, 379/355.1, 355.09; 455/415, 457
See application file for complete search history.

(56) References Cited

U.S. PATENT DOCUMENTS

| | | | | |
|---|---|---|---|---|
| 7,760,861 | B1 * | 7/2010 | Croak | H04M 15/47 379/114.14 |
| 2010/0169156 | A1 * | 7/2010 | Gustafson | G06Q 30/02 705/14.1 |
| 2018/0075454 | A1 * | 3/2018 | Claridge | G06Q 20/4016 |
| 2019/0020759 | A1 * | 1/2019 | Kuang | G06N 20/00 |
| 2019/0147430 | A1 * | 5/2019 | Chen | G06N 20/20 705/40 |
| 2021/0081468 | A1 * | 3/2021 | Raman | G06Q 30/0224 |

* cited by examiner

*Primary Examiner* — William J Deane, Jr.

(57) ABSTRACT

A method of adapting customer care handling automated workflows. The method comprises creating records of calls by a subscriber to a customer care handling system, analyzing the records of calls by a customer care handling adaptation application, comparing by the application a frequency of calls to customer care and a frequency of account credits granted to the subscriber to a correlation threshold, where the correlation threshold is randomly varied within predefined correlation values, tagging the wireless communication service account of the subscriber by the application as manipulative of customer care, receiving a call from the subscriber to the customer care handling system, determining by the customer care handling system that the subscriber is tagged as manipulative of customer care, and adapting the handling automated workflow for the subscriber by the customer care handling system based on the determination that the subscriber is tagged as manipulative of customer care.

20 Claims, 5 Drawing Sheets

SYSTEM AND METHOD OF ADAPTING CUSTOMER CARE BASED ON SUBSCRIBER STATE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication service providers may provide a customer care facility for service subscribers. When a subscriber wishes to add a new line to their wireless communication service account or upgrade their mobile phone, he or she may reach out to customer care. Alternatively, if a subscriber experiences a problem with his or her mobile phone or communication service, he or she may contact customer care to report the problem and to seek a solution to the problem. The customer care facility may support both voice call communication channels and web based communication channels. In some cases, the customer may phone in to customer care and navigate through an interactive voice recognition (IVR) interface to obtain service to address common problems.

SUMMARY

In an embodiment, a method of adapting customer care handling automated workflows is disclosed. The method comprises creating records of calls to a customer care handling system by a wireless communication service subscriber and analyzing the records of calls to the customer care handling system by a customer care handling adaptation application that executes on a computer system, wherein the analyzing determines a frequency of calls to customer care of the subscriber, a reason associated with each of the calls to customer care of the subscriber, and a frequency of account credits granted to the subscriber. The method further comprises determining by the application that the frequency of calls to customer care exceeds a predefined call frequency threshold, determining by the application that the reasons of different calls to customer care during a predefined time duration are different reasons, determining by the application that the frequency of account credits granted to the subscriber exceeds a predefined credit frequency threshold, and tagging the wireless communication service account of the subscriber by the application as manipulative of customer care. The method further comprises receiving a call from the subscriber to the customer care handling system, determining by the customer care handling system that the subscriber is tagged as manipulative of customer care, and adapting the handling automated workflow for the subscriber by the customer care handling system based on the determination that the subscriber is tagged as manipulative of customer care, wherein adapting the automated workflow comprises proposing to the subscriber that a customer care expert call back to the subscriber.

In another embodiment, a customer care handling system is disclosed. The system comprises a processor, a memory, a customer care handling application stored in the memory, and a customer care handling adaptation application stored in the memory. When executed by the processor, the customer care handling application receives customer care communications from wireless communication service subscribers, creates records of customer care communications, and performs customer care handling automated workflows based on a tag state of the subscribers. When executed by the processor, the customer care handling adaptation application analyzes the records of customer care communications, determines based on analyzing the records that a subscriber correlates to a customer care system manipulator behavior pattern, and sets the tag state of the subscriber to customer care system manipulator, whereby the customer care handling application adapts customer care handling automated workflows based on the tag state.

In yet another embodiment, a method of adapting customer care handling automated workflows is disclosed. The method comprises creating records of calls by a wireless communication service subscriber to a customer care handling system, analyzing the records of calls to the customer care handling system by a customer care handling adaptation application that executes on a computer system, wherein the analyzing comprises determines a frequency of calls to customer care of the subscriber, a reason associated with each of the calls to customer care of the subscriber, and a frequency of account credits granted to the subscriber, comparing by the application the frequency of calls to customer care and the frequency of account credits granted to the subscriber to a correlation threshold, where the correlation threshold is randomly varied within predefined correlation values, and tagging the wireless communication service account of the subscriber by the application as manipulative of customer care. The method further comprises receiving a call from the subscriber to the customer care handling system, determining by the customer care handling system that the subscriber is tagged as manipulative of customer care, and adapting the handling automated workflow for the subscriber by the customer care handling system based on the determination that the subscriber is tagged as manipulative of customer care.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
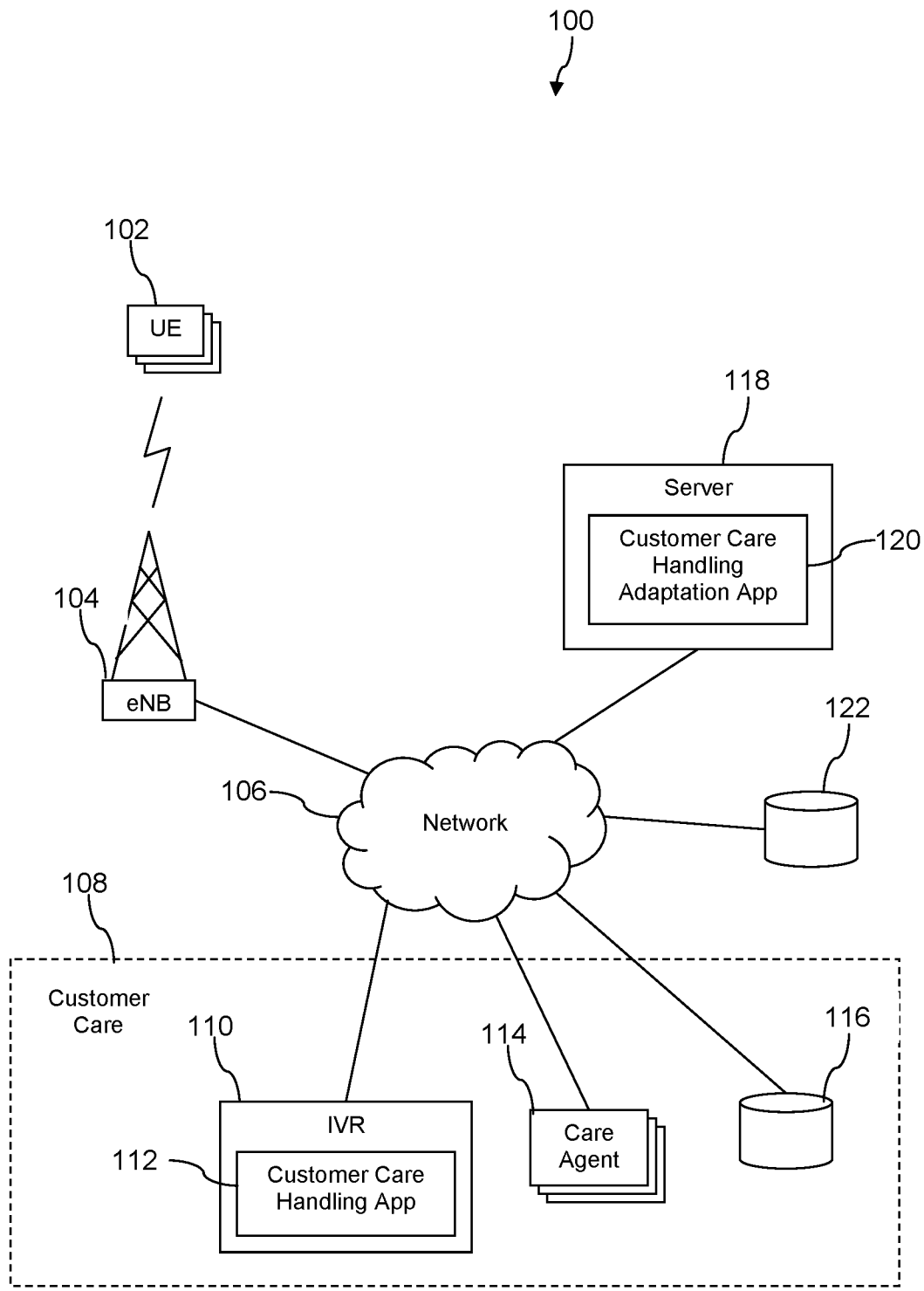
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Customers of wireless communication service providers occasionally experience problems with their wireless service, their mobile communication devices, or their account billing. Service providers may establish a customer care facility (sometimes also referred to as a customer care center) that customers can use to resolve the problems they experience. Customers may communicate with customer care via voice communication or via a web site interface. An array of different customer care services and functionalities are supported by service providers. One customer care service, for example, is an interactive voice recognition (IVR) system that attempts to route the call to care, based on caller menu selections in response to menu prompts, through a series of categories and subcategories of issues to resolve the difficulty. The IVR system may promote the caller to care resolving his or her problem themselves, for example by routing them to an automated system to pay a delinquent bill and restore their suspended wireless communication service. The IVR system may recommend that the caller turn off unused radios on the mobile communication device to solve a reported battery rapid discharge problem. Alternatively, the IVR system may route the call to a care agent who is trained to resolve the category of difficulty that the customer is experiencing. Wireless service providers have a vital interest in keeping their customers satisfied and invest considerable sums of money in establishing and staffing the customer care facility.

It has been observed that some wireless service customers have learned to "game the system" by obtaining frequent credits on their bills (e.g., an addition of funds to a subscription account balance), whereby to avoid the burden of paying for their wireless communication service bills. While these "game the system" customers are a small fraction of all customers, and the vast majority of callers to customer care are sincerely seeking to resolve their legitimate difficulties, those who game the system represent a non-trivial and increasing financial drain on wireless communication service providers. Sometimes procedures are published in on-line web sites explaining how to "game the system" to obtain credits. The present disclosure teaches a system and methods for detecting and deterring these attempts to game customer care and extract unmerited credits, while at the same time not degrading service provided to customers who call care with a sincere intention of resolving difficulties. Subscribers who attempt to "game the customer care system" to obtain frequent credits may be referred to in some contexts as manipulators of customer care and may be said to be manipulative of customer care.

The customers who attempt to "game the system" can be associated with a customer care system manipulation pattern of behavior or a customer care abuse pattern of behavior. The pattern includes having a postpaid wireless service account that is in collections. The pattern includes frequent calls to customer care reporting different problems. The pattern includes frequent small credits to the customer's service account granted during calls to customer care. For example, the pattern may include more than five calls to customer care which resulted in small credits to the customer's service account per week. The pattern may include more than five calls to customer care which resulted in small credits to the customer's service account within one hour.

It may be questioned whether these behaviors that are indicative of "gaming the system" can unfairly categorize sincere customers simply experiencing a perfect storm of technical problems as manipulators of customer care or as abusers of customer care. To avoid this eventuality, other factors can be used to corroborate a supposition of customer care manipulation or customer care abuse and to reduce the chances that a sincere subscriber is mistakenly deemed a manipulator of customer care. For example, a customer having legitimate difficulties usually tries to resolve all the problems in one call rather than making multiple calls to customer care, each call addressing a different problem. A customer who has legitimate difficulties that results in their calling to customer care many times per week for many weeks is likely to switch service provider! If the customer doesn't switch service provider but keeps calling to customer care with many calls, each call citing a different problem, and gets frequent bill credits, that is likely a customer who is "gaming the customer care system." Another corroborative indicator is a postpaid subscription account in collections (e.g., subscription fee is overdue). The types of credits can be a corroborative indicator. For example, a series of small credits for different issues over a short period of time may be indicative of gaming the system. The timing of the customer's calls to care may also be a corroborative indicator. For example, if the customer makes frequent calls to care, but only calls care several days just prior to his or her monthly recurring charge (MRC) coming due, this can contribute to the presumption that the customer is gaming the system to obtain unmerited credits. Again, just as one swallow does not a summer make, one indicator of abuse does not make a care abuse pattern of behavior. On the other hand, the combination of a plurality of corroborating indicators of abuse reduces to a statistically irrelevant level the likelihood that the caller to care is not gaming the system and is sincerely seeking to resolve a communication difficulty.

One way that a sincere caller to customer care can be distinguished from a potential "gaming the system" type of caller is to offer to have an expert care agent call back within a short duration of time to work with the customer to resolve the problem. A caller who is intent on "gaming the system" to obtain account credits does not want to wait and does not want to talk to an expert. A caller who is sincere and wants to resolve a legitimate difficulty will often want to speak to an expert. Further, a consistent pattern of refusing many offers of an expert call-back over many separate calls to customer care within a short interval of time, each call reporting different problems, can be more clearly associated with a "game the system" motivation. What subscriber who sincerely desires to resolve his or her wireless communication service problem and is calling customer care multiple times over a short interval of time repeatedly rejects the option of having an expert call them back to resolve the difficulty?

Another way that a sincere caller to customer care can be distinguished from a potential "gaming the system" type of caller is to offer to connect the call to a care agent expert in resolving the reported difficulty at the cost of a token amount of money added to the customer's postpaid service account, for example $5. Often an individual who has called customer care many times without having his or her wireless communication service difficulty resolved and who is sincere about wanting to resolve the difficulty will gladly pay the $5 fee while the "gaming the system" type of caller will reject this offer. If a caller accepts the offer of help at the expense of $5, this indicates the caller is sincere and the charge may be waived in that instance.

Another way that a sincere caller to customer care can be distinguished from a potential "gaming the system" type of caller is to offer an option to receive a credit to the subscriber's account but with a delay of several days and an alternative option to the deferred credit. It has been observed that "gaming the system" type of callers typically reject deferred credits.

The customer care system creates records of customer interactions and stores them in a data store. A customer care handling adaptation application analyzes the records of calls to care and applies a criteria such as those described above to identify subscribers who are tagged as putative care abusers. In some contexts, putative care abusers may be referred to as manipulators of customer care. In an embodiment, the identities of subscribers whose history of calls to care fit the criteria are added to a list of putative care abusers, instead of being tagged. The customer care handling adaptation application may execute periodically to analyze all subscribers who have called customer care over a recent window of time, for example over the last month. The customer care handling adaptation application may be triggered by each call to care, to analyze the care call history of the calling subscriber. The customer care handling adaptation application adapts a customer care handling application that executes in an IVR system based on the care abuser tag and/or based on the customer being placed on a list of putative care abusers. For example, the customer care handling application determines the customer phone number, looks up that this is a care abuser, and differentially provides tailored care for this care abuser subscriber.

This tailored or adapted care may take a variety of different forms. One tailored care action may be to offer the caller the option to be called back by an expert in the caller's indicated category of difficulty (e.g., indicated by selection of IVR menu options) in a few minutes to resolve his or her reported problem. The alternative action, if the customer does not select the expert call back option, may be to wait in a longer than average queue to speak with a care representative. A subscriber who is sincerely seeking to resolve a difficulty with his or her wireless communication service and not to game the system for unmerited credits will likely welcome the offer for an expert to call back to help resolve the difficulty.

Another tailored care action may be to offer a small credit on the subscriber's account but stipulate that the credit will be delayed for several days and that the credit will be withdrawn if the user calls back to care too many times before the credit takes effect. A subscriber who is sincerely seeking to resolve a problem and not to game the system will not be likely to bridle at such a restriction on the offer of the credit.

These two specific tailored care actions attack the strategy of the care abuser rapidly accruing many small credits to pay their subscription account bill without significantly interfering with assisting a caller who has a sincere interest in resolving his or her wireless communication difficulty rather than in obtaining unmerited account credits. In an embodiment, the response of the caller to care—rejecting the offer of a call back from an expert and/or rejecting the delayed credit—can itself be used as information indicative of a pattern of customer care abuse.

Another tailored care action may be to scramble and/or reorder the navigation through the IVR menu, whereby to deter the care abuser from learning the IVR menu navigation tree and zipping through to try to get another credit from a different care representative. Because the order of IVR navigation selections is scrambled or reordered, the caller must actually listen to the narrative of the automated voice prompt before making his or her menu selection, thereby preventing the caller from short-cutting around the playback of the automated voice message and saving time. This tailored action may also be referred to as changing IVR menu options. Changing IVR menu options may involve changing the selection number associated with an IVR menu option or changing the selection numbers associated with a plurality of IVR menu options. Some IVR menu options may not be made available to a caller who is deemed a putative care abuser. In particularly egregious cases of care abuse, the IVR menu option to speak to a human care agent may not be made available to the caller. Some IVR menu options may be added for a caller who is deemed a putative care abuser. Again, the tailored care action should not interfere with assisting a caller who has a sincere interest in resolving his or her wireless communication difficulty rather than obtaining unmerited account credits, but it does foil the attempt of a "game the system" caller from rapidly transiting the IVR menu to rack up a series of unmerited account credits in a short period of time. Another tailored care action may be to offer expert care agent assistance in return for a modest fee as described above. Another tailored care action is to route the care abuser only to self-care recorded messages and not provide a path through to a human care agent.

The customer care handling adaptation application may periodically analyze the customer care call histories and reevaluates the care abuser tags that have been assigned to some subscribers. If the care abuser, on a second analysis, does not clearly match the care abuser criteria, the customer care handling adaptation application may remove the putative care abuser tag from that subscriber or remove the subscriber from the list of putative care abusers. In this case, on future calls to customer care, that subscriber does not receive customer care tailored to a putative care abuser but instead normal customer care treatment. On the other hand, often the behavior of a care abuser is further confirmed by their customer care interactions when they have begun to receive treatments tailored to care abusers. In this case, as a preliminary assessment as a care abuser is more fully confirmed, the tailored care treatment may be adapted to more aggressively deter the continued abuse of customer care. If a care abuser reforms his or her care behavior at one time but returns to a pattern of customer care abuse again later, the customer care handling adaptation application may apply broader criteria for being tagged a care abuser, in view of the subscriber's past history of care abuse. For example, the customer care handling adaptation application may apply a lower threshold for qualifying for receiving care action tailored to putative care abusers.

The first step of the analysis may determine whether the caller to care has made more than a threshold number of calls to customer care over a recent window of time, for example over the last month. In other embodiments, different time windows may be used, for example a recent window of time of the last 7 days, a recent window of time of 3 months or 90 days. If the caller is not currently tagged or listed as a care abuser and has not called to care more often than the predefined threshold, the customer care handling adaptation application may truncate analysis of the care call history of that subscriber and the subscriber is not tagged as an abuser of customer care. Because the vast majority of subscribers who call customer care are not abusers of customer care, this initial analysis and truncation approach of the customer care handling adaptation application can save much unnecessary processing time that might otherwise be expended analyzing the care call histories of those subscribers.

In an embodiment, an analysis of a quality score of wireless communication service delivered to subscribers may be determined and stored in a data store. This analysis may be performed based on performance metrics generated by the radio access network (RAN) and/or by the service provider's core network. In some contexts, this quality score may be referred to as an objective score or a technical score and represents in numerical form a level of the quality of wireless communication service. In an embodiment, the customer care handling adaptation application may adapt the care abuse criteria based on the wireless communication quality score associated with the subscriber. For example, if the wireless communication quality score associated with a first subscriber is lower than the wireless communication quality score associated with a second subscriber, a more permissive (e.g., less likely to deem a subscriber an abuser of care) criteria may be applied by the customer care handling adaptation application when analyzing the care call history of the first subscriber versus the criteria applied by the customer care handling adaptation application when analyzing the care call history of the second subscriber. In an embodiment, a care agent may be able to override the tagging or listing of a subscriber as a putative care abuser, for example based on talking to the subscriber and determining that the subscriber's circumstances are special and exculpatory.

The system described above comprises a complex information technology solution. A nation-wide wireless communication service provider provides service to tens of millions of subscribers and handles a large volume of calls to customer care at all times of the day. Some customer care call centers are located in-country and other customer care call centers are located out-of-country. The records of all the calls to the customer care facility need to be funneled together into the data store timely and smoothly to support periodic analysis by the customer care handling adaptation application. The IVR system must promptly triage and route the calls to customer care and provide useful service, with a priority being placed on serving non-abusive callers—who are the vast majority of callers to care—promptly and efficiently.

Turning now to FIG. 1, a communication system 100 is described. In an embodiment, the system 100 comprises a plurality of mobile communication devices (UEs) 102, a plurality of cell sites 104, and a network 106. The UEs 102 may be any of a mobile phone, a smart phone, a wearable computer, a headset computer, a laptop computer, a tablet computer, or a notebook computer. The cell site 104 may provide a wireless link to the UE 102 and provide communication connectivity of the UE 102 to the network 106. The cell site 104 may provide the wireless link to the UE 102 according to a long term evolution (LTE), a code division multiple access (CDMA), a global system for mobile communications (GSM), or a worldwide interoperability for mobile communications (WiMAX) telecommunications protocol. The cell site 104 may provide the wireless link to the UE 102 using a fifth generation (5G) wireless protocol. The network may be one or more private networks, one or more public networks, or a combination thereof.

The UE 102 may establish voice calls or data calls via the cell site 104 and the network 106. The UE 102 may call a customer care facility 108 to seek assistance in resolving legitimate problems or difficulties associated with its wireless communication service. The UE 102 may call seeking advice on repairing a device with a broken touch screen glass window resulting from an accidental fall. The UE 102 may call seeking help in removing a virus from the UE 102. The UE 102 may call to pay an overdue subscription account bill. The UE 102 may call to report a lack of cell coverage along a rural area driving to work. The UE 102 may call to seek assistance in resolving a wide range of wireless communication service issues.

In an embodiment, the customer care facility 108 comprises an interactive voice recognition (IVR) system 110 that executes a customer care handling application 112, a plurality of customer care agent workstations 114, and a data store 116. The care agent workstations 114 and the data store 116 are communicatively coupled to the IVR system 110 via the network 106. The IVR system 110 may be implemented as a computer system. The customer care agent workstations 114 may be implemented, at least partially, as computers. In an embodiment, the customer care workstations 114 each comprises a computer and a voice communication headset for conducting telephone voice calls with callers to the customer care facility 108. Computer systems are described more fully hereinafter.

Calls from the UE 102 to the customer care facility 108 are routed to the IVR system 110 and receive automatic care treatment provided by the customer care handling application 112. The caller is prompted by the IVR system 110 to answer questions or to select from a list of menu items. As the IVR system 110 receives these answers and/or menu selections it analyzes them and offers follow-on questions and/or menu options that the caller may select from, whereby to automatically route the caller to appropriate customer care treatment option.

Some of the automatic care treatment options include routing the UE 102 call to a care agent workstation 114 for handling by a call agent. The care agent workstation 114 comprises a telephone functionality, for example a headset phone. The care agent may use his or her workstation 114 for conducting services on behalf of the caller to care and/or to review troubleshooting prompts. For example, the care agent may use his or her workstation 114 to enter a credit to the account balance of a subscriber to improve customer satisfaction under certain conditions. The care agent may use his or her workstation 114 to complete care call follow-up documentation. The path the caller to care follows in navigating the IVR system 110 (e.g., as captured by the IVR system 110), the actions of the care agent work station, and the follow-up documentation may be stored in the data store 116. This data written to the data store may be keyed or referenced by a phone number of the UE 102 or by another unique identifier.

The system 100 further comprises a server computer 118 that executes a customer care handling adaptation application 120. The server computer 118 may be implemented as a computer system. Computer systems are described further hereinafter. In an embodiment, the server computer 118 may be one or more virtual servers executing on a computer system. In an embodiment, the server computer 118 may be one or more virtual machines executing in a cloud computing environment. In an embodiment, the system 100 further comprises a wireless communication service quality score data store 122. The wireless communication service quality score data store 122 comprises quality scores for a plurality of subscribers calculated by a quality scoring server (not shown) based on performance metrics generated by a radio access network (RAN) and/or by a wireless service provider network.

The customer care handling adaptation application 120 periodically analyzes customer care records stored in the data store 116. For example, the adaptation application 120 periodically analyzes the stored records in the data store 116 to identify subscribers that exhibit a customer care usage pattern that is associated with abuse of the customer care system. Customer care system abuse can be defined as using resources of the customer care facility 108 for purposes other than resolving legitimate customer care issues, for example using customer care to extract small credits to a subscription account to appease an indignant subscriber complaining about a trivial matter. It is understood that an abusive customer care usage pattern is not indicated by a single dubious subscriber behavior but rather is signaled by a whole constellation of associated subscriber behaviors which collectively lead to the reasonable assumption that the subscriber is gaming the customer care facility 108 to collect unmerited credits to his or her subscription account.

If the customer care handling adaptation application 120 determines that a UE 102 and/or subscription account matches the customer care abuse criteria, the adaptation application 120 tags the UE 102 and/or the subscription account with an abuse tag. Alternatively, the adaptation application 120 may add the UE 102 to a list of putative care abusers. In an embodiment, the abuse tag may be defined to have different levels of abusiveness. For example, the abuse tag may be a level 1 abuse tag, a level 2 abuse tag, and a level 3 abuse tag. Alternatively, the UE 102 may be added to a list of level 1 care abusers, a list of level 2 care abusers, or a list of level 3 care abusers. In another embodiment, there may be more or fewer different levels of care abuse defined by the adaptation application 120. The different levels of abuse tag may be associated with varying levels of identification with abuse criteria or pattern. The different levels of abuse tag may be associated with a time duration of a UE 102 and/or subscriber matching abuse criteria. The different levels of abuse tag may be associated with a closeness of match to the worst case abuse profile. The different levels of abuse tag may be associated with a history of customer care abuse recidivism.

The customer care handling application 112 executing in the IVR system 110 can be configured to look up the abuse tag status of a UE 102 and/or a subscriber in the data store 116 based on a phone number of the UE 102 or other unique identifier of the UE 102 and/or the subscription account. The handling application 112 is designed to differentially handle calls to the IVR system 110 based on the abuse tag status associated with the UE 102 and/or the subscription account associated with the UE 102 or based on membership of the UE 102 and/or the subscription account in a list of putative care abusers. The IVR menu navigation path of callers to the IVR system 110 may be defined in a data table that is stored in the data store 116 or in a non-transitory memory of the IVR system 110. The abuse tag status associated with the UE 102 may be used to select an IVR menu navigation path from the data table. This IVR menu navigation path may be different for different levels of care abuse tag status.

One IVR menu navigation path may promote routing the call to a recorded voice message offering to have an expert (e.g., an expert in the problem selected from the IVR menu by the caller) call the UE 102 back within a short duration of time to render assistance in solving the problem or later at a time of lower customer care call volume. If the caller to care sincerely wishes to resolve his or her problem, this suggestion is often welcome. A caller to care who instead is seeking to game the system knows that they will not succeed in wheedling unmerited account credits from a subject matter expert and rarely accepts the offer. The refusal of the offer to receive a call back from a subject matter expert may be considered a corroboration cue for deeming a UE 102 a care abuser or to intensifying the abuse tag status of the UE 102.

Another IVR menu navigation path may involve randomly varying the navigation paths over a sequence of calls to care from the same UE 102, whereby to prevent the UE 102 zipping through the IVR menu to reach a care agent and plead for a small account credit. This often deters a subscriber wishing to game the system but rarely seriously perturbs or inconveniences a sincere caller to the customer care facility 108. It is one of the benefits of the customer care handling application 112 and the customer care handling adaptation application 120 that the tailored treatment for lower levels of abuse tag status minimally impact or perturb the care experience of marginally abusive (e.g., not deliberately gaming the system) UEs 102 while impeding and discouraging those who are intentionally gaming the system.

Another IVR menu navigation path may ask the UE 102 if the subscriber is willing to pay a nominal fee to speak with an expert care agent, for example request $5 fee that would be added to the subscriber's monthly bill. Many subscribers who have a legitimate difficulty and a sincere desire to resolve their difficulty would be happy to take this offer. Such a response may be deemed indicative of good faith in using the customer care facility 108 and may in fact be waived by the wireless communication service provider. On the other hand, a subscriber who is gaming the system typically will not take this deal, and that choice can be analyzed as further user behavior corroborative of care abuse.

In an embodiment, an IVR menu navigation path for a high level abuse tag status does not provide a path to reaching a care agent 114 and only offers recordings of suggested self-help actions. In an embodiment, the IVR menu navigation path at all levels of abuse tag status may be revised periodically to thwart learning and promulgation of account credit gaming processes on the Internet.

In an embodiment, the care abuse criteria applied by the adaptation application 120 may be modulated based on the wireless communication quality score associated with the UE 102 in the data store 122. For example, if the wireless communication quality score associated with a first subscriber is lower than the wireless communication quality score associated with a second subscriber, a more permissive (e.g., less likely to deem a subscriber an abuser of care) criteria may be applied by the customer care handling adaptation application 120 when analyzing the care call history of the first subscriber versus the criteria applied by the customer care handling adaptation application 120 when analyzing the care call history of the second subscriber. In an embodiment, a care agent workstation 114 may be able to override the tagging or listing of a subscriber as a putative care abuser, for example based on talking to the subscriber and determining that the subscriber's circumstances are special and exculpatory.

Figure 2A:
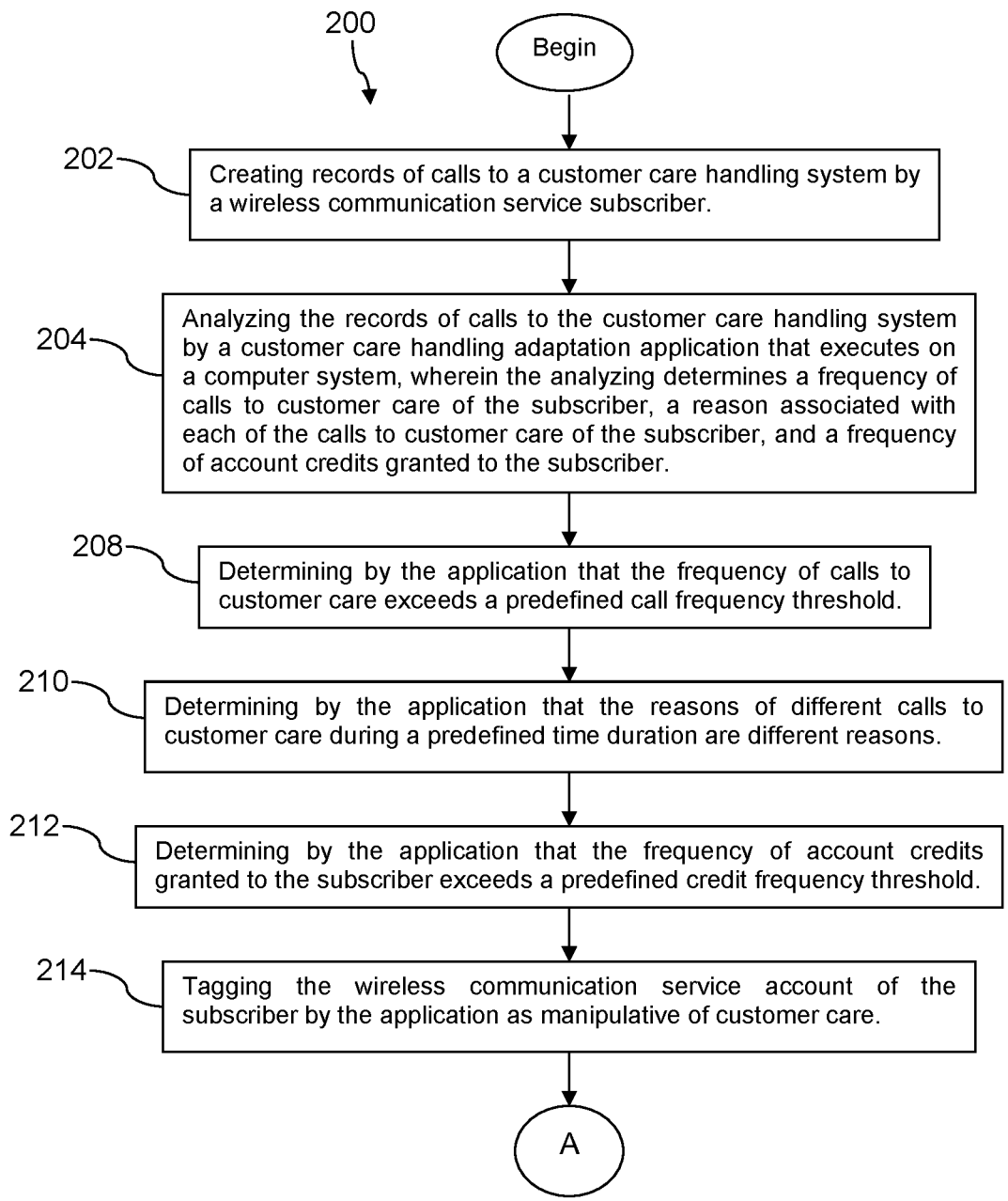
FIG. 2A and FIG. 2B is a flow chart of a method according to an embodiment of the disclosure.
Figure 2B:
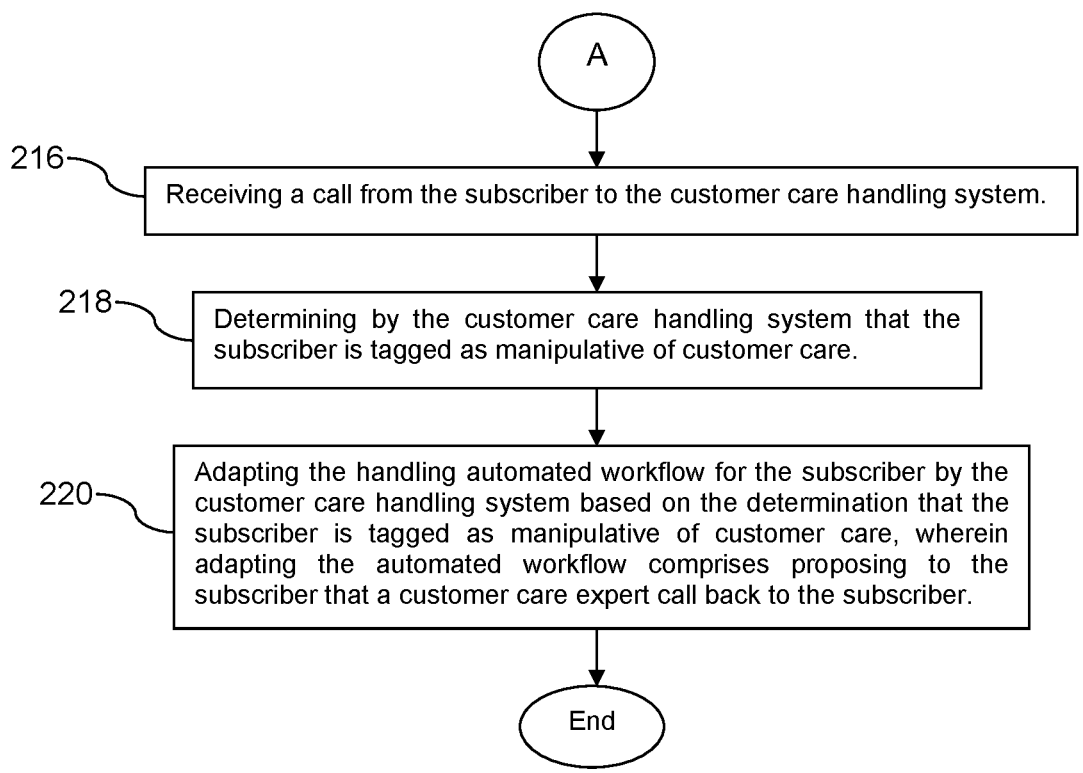

Turning now to FIG. 2A and FIG. 2B, a method 200 is described. The method 200 is a method of adapting customer care handling automated workflows. In an embodiment, a benefit of the method 200 is that it may deter subscribers who desire to manipulate the customer care facility 108 to obtain unmerited account credits while at the same time it may not interfere materially with providing good assistance to subscribers who call the customer care facility 108 with a sincere intent to obtain help resolving a wireless communication difficulty they are experiencing.

At block 202, the method 200 comprises creating records of calls to a customer care handling system by a wireless communication service subscriber. Some of the records may be automatically generated by the IVR system 110. Some of the records may be completed by a care agent upon call completion. The records of calls to the customer care facility 108 may be stored in the data store 116. At block 204, the method 200 comprises analyzing the records of calls to the customer care handling system by a customer care handling adaptation application that executes on a computer system, wherein the analyzing determines a frequency of calls to customer care of the subscriber, a reason associated with each of the calls to customer care of the subscriber, and a frequency of account credits granted to the subscriber. The analysis of block 204 may comprise accessing or reading the records of calls to the customer care handling system from the data store 116.

At block 208, the method 200 comprises determining by the application that the frequency of calls to customer care exceeds a predefined call frequency threshold. For example, the processing of block 208 determines that the frequency of calls over a recent window of time exceeds a predefined threshold. At block 210, the method 200 comprises determining by the application that the reasons of different calls to customer care during a predefined time duration (e.g., over a recent window of time) are different reasons. At block 212, the method 200 comprises determining by the application that the frequency of account credits granted to the subscriber exceeds a predefined credit frequency threshold. For example, the processing of block 212 determines that the frequency of account credits granted to the subscriber over a recent window of time exceeds a threshold. The determinations of block 206, 208, 210, and 212 may be said to correspond to or correlate to a criteria for deeming a subscriber a putative care abuser. Said in other words, the determinations of block 206, 208, 210, and 212 can be used to determine that the behavior of the subscriber correlates to a customer care system abuser behavior pattern or a customer care system manipulator behavior pattern. In an embodiment, the criteria may be randomly varied within a predefined range of values. In an embodiment, the predefined range of values for the criteria may be adapted based on a quality score of the wireless communication service provided to the subscriber.

At block 214, the method 200 comprises tagging the wireless communication service account of the subscriber by the application as manipulative of customer care. In some contexts, a subscriber who is tagged as manipulative of customer care may be said to be a manipulator of customer care and to be an abuser of customer care. The tag applied to the wireless communication service account may indicate an abuse severity level or a care abuse diagnosis confidence level. In an alternative embodiment, the processing of block 214 comprises adding the identity of the subscriber or the subscriber's wireless communication service account to a list of care abusers. The list may be associated with one of a plurality of different levels of abuse severity.

At block 216, the method 200 comprises receiving a call from the subscriber to the customer care handling system. At block 218, the method 200 comprises determining by the customer care handling system that the subscriber is tagged as manipulative of customer care. Said in other words, the processing of block 218 comprises determining that the subscriber has been deemed a putative care abuser, for example by determining that the subscriber entry in the data store 116 indicates the subscriber is tagged as a putative care abuser or determining that the identity of the subscriber is present in a list of putative care abusers. At block 220, the method 200 comprises adapting the handling automated workflow for the subscriber by the customer care handling system based on the determination that the subscriber is tagged as manipulative of customer care, wherein adapting the automated workflow comprises proposing to the subscriber that a customer care expert call back to the subscriber. Alternatively, the processing of block 220 may comprise providing different tailored action to the subscriber and/or the UE 102. For example, the processing of block 220 may comprise configuring the customer care handling application 112 to scramble the order of the IVR menu selections the next time the subscriber calls in to the IVR system 110. For example, the processing of block 220 may comprise offering the subscriber and/or UE 102 a credit on his or her account but only after a minimum number of days (e.g., after 5 days, after 7 days, after 10 days, or after some other number of days) and stipulating that other calls to the customer care facility 108 for the same call reason during the time before the credit is applied will cause the credit to be cancelled.

Figure 3:
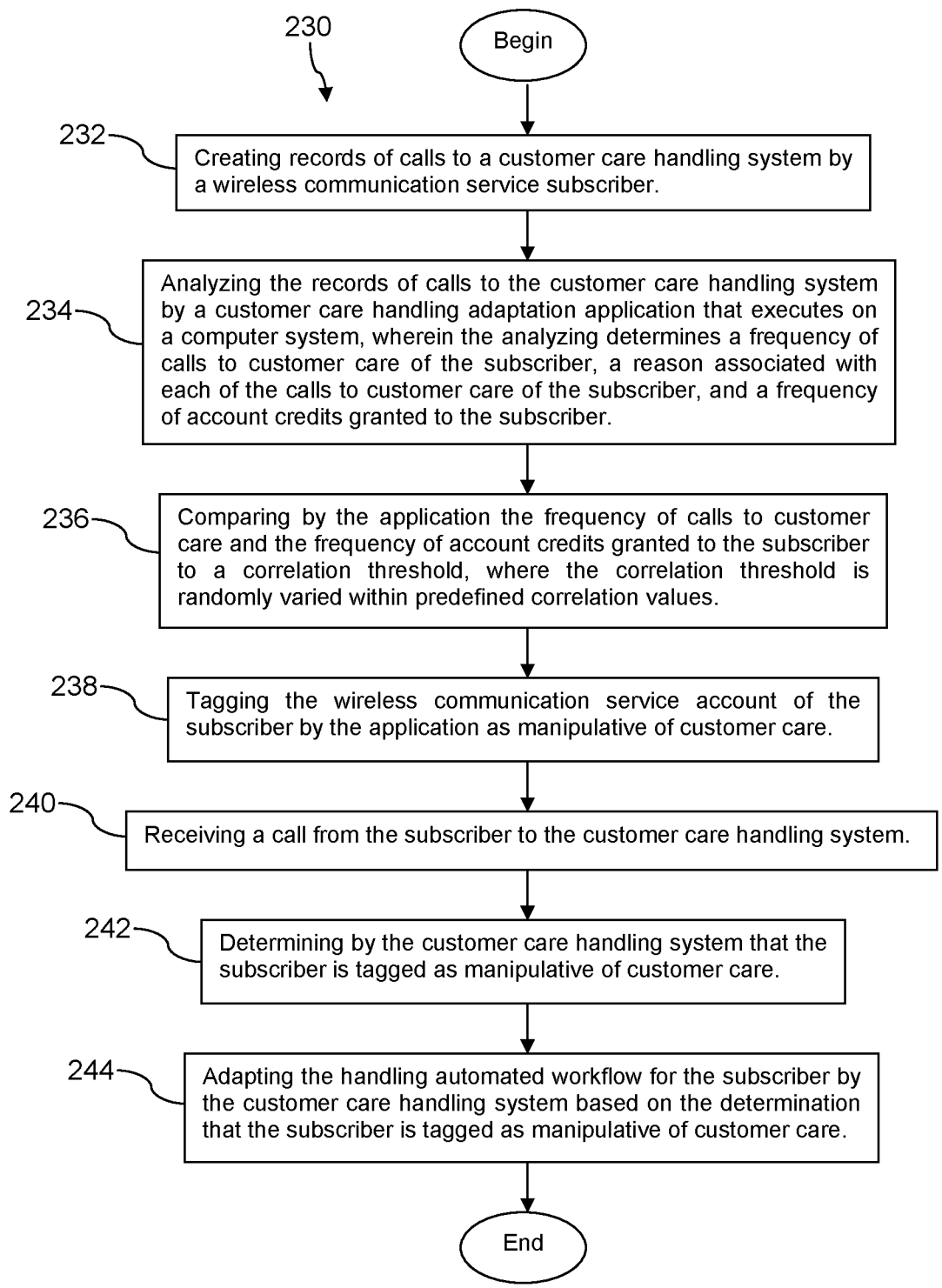
FIG. 3 is a flow chart of a method according to an embodiment of the disclosure.

Turning now to FIG. 3, a method 230 is described. The method 230 is a method of adapting customer care handling automated workflows. At block 232, the method 230 comprises creating records of calls to a customer care handling system by a wireless communication service subscriber. At block 234, the method 230 comprises analyzing the records of calls to the customer care handling system by a customer care handling adaptation application that executes on a computer system, wherein the analyzing determines a frequency of calls to customer care of the subscriber, a reason associated with each of the calls to customer care of the subscriber, and a frequency of account credits granted to the subscriber.

At block 236, the method 230 comprises comparing by the application the frequency of calls to customer care and the frequency of account credits granted to the subscriber to a correlation threshold, where the correlation threshold is randomly varied within predefined correlation values. Randomly varying the predefined correlation values may deter either someone determining a recipe for gaming the customer care system and sharing that recipe with many others or may deter those who would attempt to apply such a recipe for gaming the customer care system. In an embodiment, the predefined range of values for the criteria may be adapted based on a quality score of the wireless communication service provided to the subscriber.

At block 238, the method 230 comprises tagging the wireless communication service account of the subscriber by the application as manipulative of customer care. In some contexts, a subscriber who is tagged as manipulative of customer care may be said to be a manipulator of customer care and to be an abuser of customer care. At block 240, the method 230 comprises receiving a call from the subscriber to the customer care handling system. At block 242, the method 230 comprises determining by the customer care handling system that the subscriber is tagged as manipulative of customer care. At block 244, the method 230 comprises adapting the handling automated workflow for the subscriber by the customer care handling system based on the determination that the subscriber is tagged as manipulative of customer care.

Figure 4:
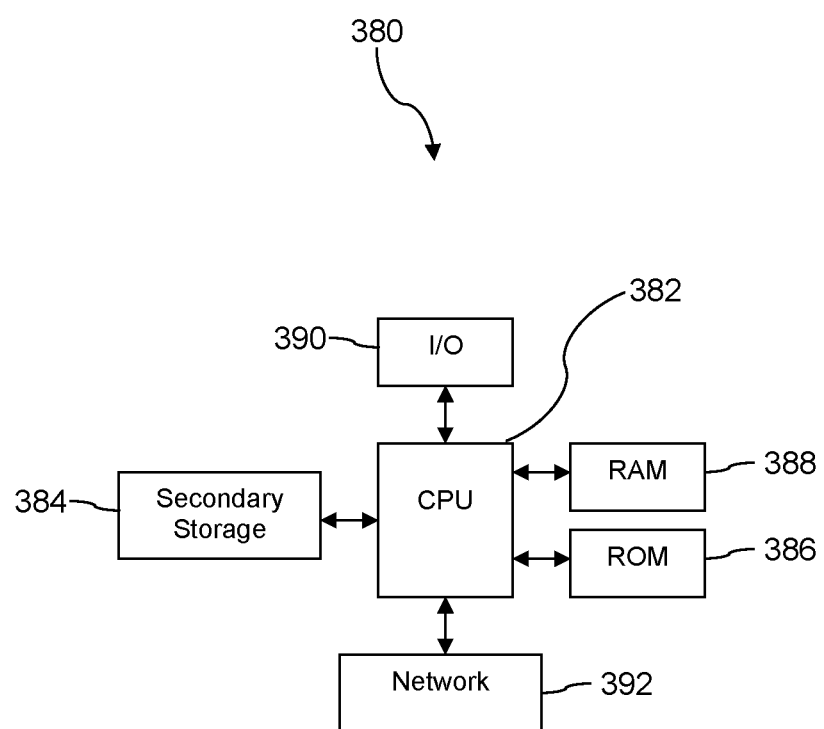
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of adapting customer care handling automated workflows, comprising:
   creating records of calls to a customer care handling system by a wireless communication service subscriber;
   analyzing the records of calls to the customer care handling system by a customer care handling adaptation application that executes on a computer system, wherein the analyzing determines a frequency of calls to customer care of the subscriber, a reason associated with each of the calls to customer care of the subscriber, and a frequency of account credits granted to the subscriber;
   determining by the application that the frequency of calls to customer care exceeds a predefined call frequency threshold;
   determining by the application that the reasons of different calls to customer care during a predefined time duration are different reasons;
   determining by the application that the frequency of account credits granted to the subscriber exceeds a predefined credit frequency threshold;
   tagging the wireless communication service account of the subscriber by the application as manipulative of customer care;
   receiving a call from the subscriber to the customer care handling system;
   determining by the customer care handling system that the subscriber is tagged as manipulative of customer care; and
   adapting the handling automated workflow for the subscriber by the customer care handling system based on the determination that the subscriber is tagged as manipulative of customer care, wherein adapting the automated workflow comprises proposing to the subscriber that a customer care expert call back to the subscriber.

2. The method of claim 1, further comprising looking up a quality score of wireless communication service delivered to the subscriber, wherein tagging the wireless communication service account of the subscriber as manipulative of customer care is based in part on the quality score.

3. The method of claim 1, further comprising:
tagging a wireless communication service account of a second subscriber by the application as manipulative of customer care;
receiving a call from the second subscriber to the customer care handling system;
determining by the customer care handling system that the second subscriber is tagged as manipulative of customer care; and
adapting the handling automated workflow for the second subscriber by the customer care handling system based on the determination that the second subscriber is tagged as manipulative of customer care, wherein adapting the automated workflow comprises proposing to grant a delayed account credit to the second subscriber.

4. The method of claim 1, further comprising:
tagging a wireless communication service account of a third subscriber by the application as manipulative of customer care;
receiving a call from the third subscriber to the customer care handling system;
determining by the customer care handling system that the third subscriber is tagged as manipulative of customer care; and
adapting the handling automated workflow for the third subscriber by the customer care handling system based on the determination that the third subscriber is tagged as manipulative of customer care, wherein adapting the automated workflow comprises proposing to the third subscriber that a care agent expert call the third subscriber in exchange for the third subscriber paying a fee for this service.

5. The method of claim 1, further comprising:
tagging a wireless communication service account of a fourth subscriber by the application as manipulative of customer care;
receiving a call from the fourth subscriber to the customer care handling system;
determining by the customer care handling system that the fourth subscriber is tagged as manipulative of customer care; and
adapting the handling automated workflow for the fourth subscriber by the customer care handling system based on the determination that the fourth subscriber is tagged as manipulative of customer care, wherein adapting the automated workflow comprises configuring an interactive voice recognition (IVR) system of the customer care handling system to provide an altered sequence of IVR menu selection to the fourth subscriber.

6. The method of claim 1, wherein tagging the wireless communication service account comprises associating a care abuse tag to the subscriber, wherein the care abuse tag comprises an identification of a level of care abuse.

7. The method of claim 1, wherein the analyzing the records of calls to the customer care handling system is performed periodically by the customer care handling application.

8. The method of claim 7, wherein the analyzing the records of calls by a subscriber to the customer care handling system is performed in response to the event of the subscriber calling the customer care handling system.

9. A customer care handling system, comprising:
a processor;
a memory;
a customer care handling application stored in the memory that, when executed by the processor:
receives customer care communications from wireless communication service subscribers,
creates records of customer care communications, and
performs customer care handling automated workflows based on a tag state of the subscribers; and
a customer care handling adaptation application stored in the memory that, when executed by the processor:
analyzes the records of customer care communications,
determines based on analyzing the records that a subscriber correlates to a customer care system manipulator behavior pattern, and
sets the tag state of the subscriber to customer care system manipulator, whereby the customer care handling application adapts customer care handling automated workflows based on the tag state.

10. The customer care handling system of claim 9, wherein analyzing the records of customer care communications by the customer care handling application comprises two or more of determining a number of calls to customer care by a subscriber over a recent window of time, determining how many credits to a subscription account the subscriber has been granted over the recent window of time, determining how many times the subscriber rejected an offer for a delayed call back from an expert care agent over the recent window of time, determining how many different call reasons have been indicated during the calls to customer care by the subscriber over the recent window of time, determining an average number of different call reasons indicated during each call to customer care by the subscriber over the recent window of time, and determining whether the subscription account of the subscriber is in collections.

11. The customer care handling system of claim 10, wherein determining that a subscriber correlates to a customer care manipulator behavior pattern is further based on a quality score of wireless communication service delivered to the subscriber at least over the recent window of time.

12. The customer care handling system of claim 9, wherein setting the tag state of the subscriber by the customer care handling adaptation application comprises associating a level of customer care system manipulation with the tag state, and wherein performing customer care handling automated workflows by the customer care handling application is based on the level of customer care system manipulation associated with the tag state.

13. The customer care handling system of claim 9, wherein performing customer care handling automated workflows by the customer care handling application comprises changing an order of interactive voice recognition (IVR) system navigation menu selections based on a tag state of the subscribers.

14. The customer care handling system of claim 9, wherein performing customer care handling automated workflows by the customer care handling application comprises offering to direct the subscriber to an expert care agent in exchange for a charge against the subscriber's wireless communication service account.

15. A method of adapting customer care handling automated workflows, comprising:

creating records of calls by a wireless communication service subscriber to a customer care handling system;

analyzing the records of calls to the customer care handling system by a customer care handling adaptation application that executes on a computer system, wherein the analyzing comprises determines a frequency of calls to customer care of the subscriber, a reason associated with each of the calls to customer care of the subscriber, and a frequency of account credits granted to the subscriber;

comparing by the application the frequency of calls to customer care and the frequency of account credits granted to the subscriber to a correlation threshold, where the correlation threshold is randomly varied within predefined correlation values;

tagging the wireless communication service account of the subscriber by the application as manipulative of customer care;

receiving a call from the subscriber to the customer care handling system;

determining by the customer care handling system that the subscriber is tagged as manipulative of customer care; and adapting the handling automated workflow for the subscriber by the customer care handling system based on the determination that the subscriber is tagged as manipulative of customer care.

16. The method of claim 15, wherein analyzing the records further comprises determining how many times the subscriber rejected an offer for a delayed call back from an expert care agent, determining an average number of different call reasons indicated during each call to the customer care handling system by the subscriber, and determining whether the subscription account of the subscriber is in collections.

17. The method of claim 15, wherein the predefined correlation values are varied based on a quality score of wireless communication service delivered to the subscriber.

18. The method of claim 15, wherein adapting the handling automated workflow for the subscriber by the customer care handling system comprises changing an order of interactive voice recognition (IVR) system navigation menu items, adding an IVR system navigation menu item, removing an IVR system navigation menu item, offering a delayed call back from an expert care agent, and offering a delayed account credit.

19. The method of claim 15, wherein the analyzing of the records of calls to the customer care handling system, the comparing to the correlation threshold, and the tagging as manipulative of customer care by the application is performed periodically.

20. The method of claim 15, further comprising removing the tag from the wireless communication service account of the subscriber.

* * * * *